(12) United States Patent
Zanichelli et al.

(10) Patent No.: US 12,330,940 B2
(45) Date of Patent: Jun. 17, 2025

(54) REACTOR AND PROCESS FOR PARTIAL OXIDATION

(71) Applicant: Casale SA, Lugano (CH)

(72) Inventors: Luca Zanichelli, Milan (IT); Giacomo Colmegna, Massagno (CH)

(73) Assignee: Casale SA, Lugano (CH)

( * ) Notice: Subject to any disclaimer, the term of this patent is extended or adjusted under 35 U.S.C. 154(b) by 596 days.

(21) Appl. No.: 17/420,940

(22) PCT Filed: Dec. 19, 2019

(86) PCT No.: PCT/EP2019/086232
§ 371 (c)(1),
(2) Date: Jul. 6, 2021

(87) PCT Pub. No.: WO2020/156743
PCT Pub. Date: Aug. 6, 2020

(65) Prior Publication Data
US 2022/0098035 A1    Mar. 31, 2022

(30) Foreign Application Priority Data

Jan. 31, 2019   (EP) .................................... 19154659

(51) Int. Cl.
*C01B 3/36* (2006.01)
*F23D 14/58* (2006.01)

(52) U.S. Cl.
CPC ............ *C01B 3/363* (2013.01); *F23D 14/583* (2013.01); *C01B 2203/0244* (2013.01); *C01B 2203/0255* (2013.01); *C01B 2203/0872* (2013.01); *F23D 2203/101* (2013.01); *F23D 2212/10* (2013.01); *F23D 2212/20* (2013.01)

(58) Field of Classification Search
CPC ............ C01B 2203/0872; C01B 3/363; F23D 2212/20; F23D 2203/101; F23D 2212/10
See application file for complete search history.

(56) References Cited

U.S. PATENT DOCUMENTS 3,901,445 A * 8/1975 Chang ...................... F23D 14/32
239/132.3
5,992,763 A * 11/1999 Smith ...................... B05B 1/00
417/198

(Continued)

FOREIGN PATENT DOCUMENTS

| EP | 0406071 A1 | 1/1991 |
| WO | 2004/112954 A1 | 12/2004 |
| WO | 2010/034819 A1 | 4/2010 |

OTHER PUBLICATIONS

International Preliminary Report on Patentability issued Jan. 25, 2021 in connection with PCT/EP2019/086232.

(Continued)

*Primary Examiner* — Matthew J Merkling
(74) *Attorney, Agent, or Firm* — Akerman LLP

(57) ABSTRACT

A process of partial oxidation is performed in a reactor which includes a reaction chamber and a burner assembly, wherein: the burner assembly has a single oxidant nozzle located within an fuel channel, said oxidant nozzle comprises a nozzle pipe and a nozzle outlet, the nozzle pipe and the fuel channel are arranged to produce a diffusion flame, the nozzle outlet has a shape with two or more elongate lobes projecting from a center of the nozzle pipe.

20 Claims, 3 Drawing Sheets

(56) References Cited

U.S. PATENT DOCUMENTS

| | | | |
|---|---|---|---|
| 6,076,745 | A | 6/2000 | Primdahl |
| 6,558,156 | B2 * | 5/2003 | Wong ...................... F23Q 2/165 |
| | | | 431/255 |
| 8,959,922 | B2 * | 2/2015 | Colmegna ................ F23R 3/28 |
| | | | 60/737 |
| 9,134,025 | B2 * | 9/2015 | Gangoli .................. F23D 14/22 |
| 9,206,979 | B2 * | 12/2015 | Cole ...................... F23D 14/58 |
| 9,435,262 | B2 * | 9/2016 | Deiss ..................... F23D 14/24 |
| 2004/0146821 | A1 * | 7/2004 | Joshi .................... F23D 14/583 |
| | | | 431/8 |
| 2007/0261304 | A1 * | 11/2007 | Zanichelli .............. B01J 8/0278 |
| | | | 48/187 |

OTHER PUBLICATIONS

International Search Report issued Mar. 30, 2020 in connection with PCT/EP2019/086232.
Rainer Reimert et al., "Gas Production, 2. Processes," In: "Ullmann's Encyclopedia of Industrial Chemistry," Oct. 15, 2011, Wiley-VCH Verlag, Weinheim, pp. 447-448.

* cited by examiner

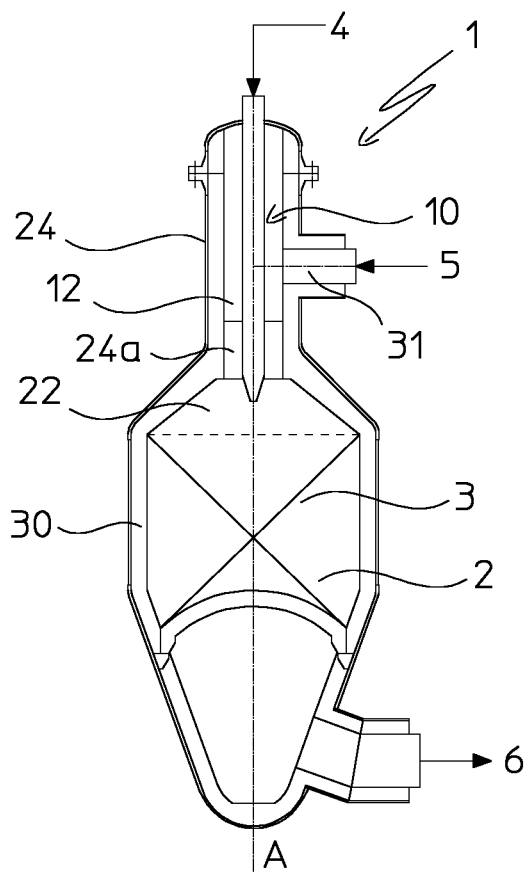
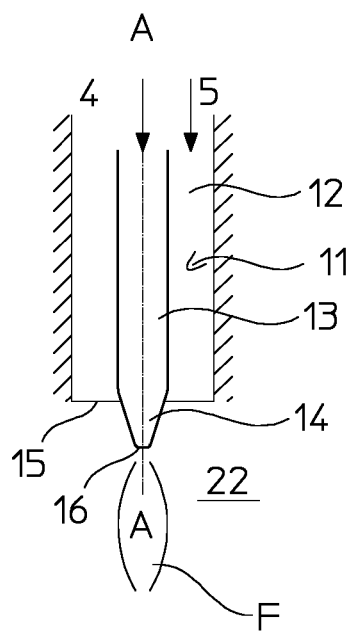
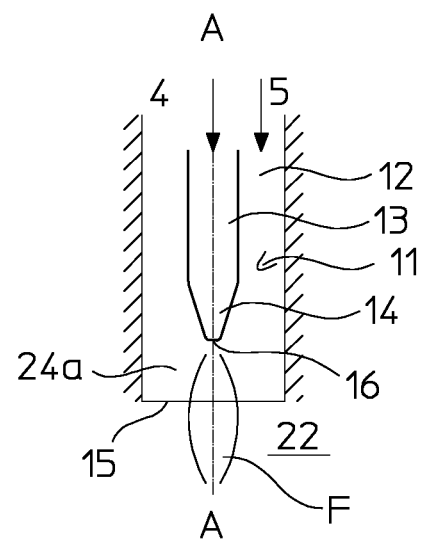
Fig. 1
Fig. 2
Fig. 3

REACTOR AND PROCESS FOR PARTIAL OXIDATION

CROSS-REFERENCE TO RELATED APPLICATIONS

This application is a national phase of PCT/EP2019/086232, filed Dec. 19, 2019, and claims priority to EP 19154659.7, filed Jan. 31, 2019, the entire contents of both of which are hereby incorporated by reference.

FIELD OF THE INVENTION

The invention relates to partial oxidation performed in ATR reactors or PDX reactors.

PRIOR ART

Autothermal reforming (ATR) and partial oxidation (PDX) reactors are widely used in the field of production of synthesis gas.

An ATR reactor can be used as a self-standing syngas generation unit or can be used for secondary reforming after a primary steam reforming in a fired furnace. An ATR reactor fed by air or enriched air is often known as secondary reformer. On the contrary PDX systems are an alternative technology typically used to convert a preheated hydrocarbon gas and oxidant.

Autothermal reforming is performed in the presence of a catalyst while partial oxidation is performed in absence of catalyst. The temperature may be around 1000 to 1300° C. for ATR (at the catalyst bed inlet) and even higher (1300° C. or more) for PDX. The pressure is typically in the range 10 to 100 bar.

The ATR and PDX reactors include a burner, which is normally installed on top of the reactor vessel, above a reaction chamber. The reaction chamber contains a catalyst in the case of ATR and is empty in the case of a PDX.

The burner is required to provide mixing between a gaseous fuel and a gaseous oxidant. The fuel may be a pre-heated hydrocarbon or a partially reformed hydrocarbon with a certain amount of steam, which may be already contained in the fuel or added to the fuel. The oxidant is normally air, oxygen-enriched air, or substantially pure oxygen, possibly added with steam. The hydrocarbon may be natural gas for example. In a known configuration, the burner includes an oxidant pipe with a circular cross section, coaxially arranged with an annular fuel pipe.

A field of particular interest for application of ATR or PDX systems is the conversion of a hydrocarbon source into a partially oxidized CO-containing synthesis gas, for example a mixture of $H_2$ and CO. Both ATR and PDX can be used to produce such gas.

A CO-containing gas still has a considerable heat value and can be used as a fuel; a $H_2$ and CO gas has also a variety of applications in the chemical industry, e.g. it is a feed for synthesis of several products including, among others, ammonia and methanol.

The production of a CO-containing gas from a hydrocarbon source however requires under-stoichiometric combustion which may lead to undesirable formation of soot. The formation of soot has several drawbacks: loss of carbon source, which is not converted into CO as desired; fouling and obstruction of conduits; need of periodical cleaning which is expensive and disposal of a pollutant and potentially carcinogenic substance.

The formation of soot is a complex process influenced by several parameters. It is known, for example, that the steam to carbon ratio and the oxygen to carbon ratio influence the formation of soot: the greater these two ratios, the lesser the formation of soot. However increasing the steam to carbon ratio and/or the oxygen to carbon ratio to inhibit soot formation has the disadvantage of increasing the consumption of steam or oxygen, which are valuable source materials.

It is also known that soot formation is reduced by intensive mixing between the fuel and oxidant. Accordingly, a number of prior art solutions try to reduce soot by giving a high velocity and/or swirling to one or both of the fuel and oxidant streams. Other solutions deviate from the common coaxial configuration of the streams in an attempt to improve mixing, for example by directing a stream of fuel perpendicular to a stream of oxidant as disclosed e.g. in U.S. Pat. No. 6,076,745. It is worthwhile to note that in these cases the burner has nevertheless an axial symmetric geometry, possibly with the exception of the swirler. These techniques and more generally all techniques based on high velocities, swirler and change of directions of the flows have the drawbacks of introducing a significant pressure loss.

U.S. Pat. No. 3,901,445 discloses a gas burner for burning a gaseous fuel with air or pure oxygen. EP 406 071 discloses a process and a reactor for partial oxidation of a hydrocarbon.

In summary, the need to reduce the soot formation forces the adoption of certain operating parameters, such as a large excess of steam/oxygen, or a high velocity and swirl of the streams, which inevitably entail some drawbacks.

Therefore, there is still the need to provide an improved design of an ATR or PDX burner which is able to reduce the soot formation and operate under more advantageous conditions, thus minimizing the above drawbacks.

SUMMARY OF THE INVENTION

The invention aims to solve the above problem and provide an improved process of partial oxidation with less soot formation, compared to the prior art, for a given set of operation parameters such as reaction pressure and temperature, steam and oxygen consumption, pressure drop of the feed streams of fuel and oxidant.

It is disclosed a reactor for partial oxidation of a gaseous hydrocarbon fuel which includes a vessel, a reaction chamber, at least one burner assembly wherein:
  said burner assembly has a single oxidant nozzle;
  the reactor includes at least one fuel channel which is in communication with an inlet of said gaseous hydrocarbon fuel;
  said oxidant nozzle comprises an oxidant nozzle pipe and an oxidant nozzle outlet;
  the oxidant nozzle pipe and the fuel channel are arranged to produce a diffusion flame in the reaction chamber;
  the oxidant nozzle outlet is shaped with two or more elongated lobes projecting radially from an axis of the oxidant nozzle pipe.

The reactor is for example a catalytic autothermal reforming reactor (ATR) or a non-catalytic PDX reactor.

Accordingly, the invention relates to a process of partial oxidation of a gaseous hydrocarbon fuel to form a product gas containing hydrogen and carbon monoxide, wherein the process is performed in the above described reactor. The process of partial oxidation according to the invention may be a catalytic autothermal reforming process according to first embodiments, or a non-catalytic process according to second embodiments.

The term burner assembly denotes a self-standing item which includes a single oxidant nozzle and which is fitted to the vessel of the reactor in a removable manner. The burner assembly is typically removable as such, for inspection, maintenance or replacement.

A burner assembly includes at least one connector (e.g. a first flange) adapted to fit a corresponding connector (e.g. a second flange) of the vessel. For example, a burner assembly is an axially elongated body to be fitted in the upper part of the vessel.

A burner assembly may be coupled to the vessel so that the oxidant nozzle of the burner assembly is at least partially within a fuel channel of the reactor.

A reactor may comprise a single burner assembly or a plurality of burner assemblies.

In a multiple-burner embodiment, the burner assemblies can be provided at different locations of the vessel. Each burner assembly may have a respective single oxidant nozzle. A reactor may include a single burner assembly mounted within a fuel channel or multiple burner assemblies wherein each burner assembly has a respective dedicated fuel channel. Burner assemblies mounted into different fuel channels may have also different fuel inputs.

Particularly, a reactor may include a plurality of burner assemblies fitted to the vessel and a plurality of fuel channels, wherein each burner assembly has a respective oxidant nozzle and each oxidant nozzle of said burner assemblies is installed within a respective fuel channel and each fuel channel hosts a single oxidant nozzle.

The reactor may include one or more fuel nozzles which do not accommodate an oxygen nozzle and are spatially separated from the oxygen nozzle(s). For example the reactor may comprise a fuel nozzle in the axis of the pressure vessel and a number of oxidant nozzles are installed as satellites around the fuel nozzle, each oxidant nozzle having a respective connection to the vessel which is spatially separated from connections of the other oxidant nozzles.

The burner assembly or assemblies is/are preferably located above the reaction chamber.

The oxidant nozzle pipe is not in communication with the fuel channel along the length of the oxidant nozzle pipe, so that the fuel begins meeting the oxidant at the oxidant nozzle outlet. Accordingly, the fuel and oxidant produce a diffusion flame in the reaction chamber.

The oxidant nozzle pipe and the fuel channel may be parallel or substantially parallel. Preferably the oxidant nozzle pipe and the fuel channel are coaxial, for example the oxidant nozzle pipe is coaxially arranged inside the fuel channel.

The oxidant nozzle outlet has a lobed shape. Accordingly, said nozzle outlet includes two or more lobes which project, preferably in a symmetric configuration, from the center of the nozzle outlet.

In an embodiment, the oxidant nozzle outlet has two elongate lobes opposite to each other, i.e. at 180°. Accordingly, said nozzle outlet may take the shape of an elongated rectangle with rounded ends.

In another embodiment, the oxidant nozzle outlet has three or more elongated lobes which are radially arranged around the center of the nozzle pipe. Accordingly, said nozzle outlet takes a star-like configuration.

Multiple radially arranged elongate lobes have preferably a regular angular spacing of 360/n degrees, where n is the number of lobes.

The applicant has found that the above configuration of the oxidant nozzle outlet reduces the formation of soot in a surprising manner, compared to prior art burners, for a given set of conditions.

Particularly, the applicant has found that a small number of said elongate lobes is preferable to reduce soot formation. Preferred embodiments have two to eight lobes, more preferably two to five, e.g. three or four lobes.

Each elongate lobe may have two substantially parallel walls which merge at a distal tip. Each elongate lobe has a radial length, from the center of the nozzle pipe to the distal tip, which is preferably greater than the distance between said two parallel walls. In a particularly preferred embodiment the ratio of said radial length over said distance is at least 2, preferably 2 to 40, more preferably 5 to 20.

The oxidant nozzle pipe and the fuel channel may have a circular cross section although a different shape, e.g. a square or rectangular cross section, may be adopted. The oxidant nozzle pipe and the fuel channel may have cross sections of the same or a different shape. The fuel channel may be also regarded as an annular pipe.

In the proximity of the nozzle outlet, the oxidant nozzle changes from a first shape of the nozzle pipe to a second shape of the nozzle outlet. In a preferred embodiment, the oxidant nozzle has a transition region wherein the shape of the oxidant nozzle gradually changes from the shape of the nozzle pipe to the shape of nozzle outlet.

The oxidant nozzle pipe may also include a portion with a cross section gradually decreasing towards the nozzle outlet. This portion of gradually decreasing cross section may include the transition region mentioned above.

Reducing the cross section is advantageous as it accelerates the oxidant stream before it meets the fuel. A gradual decrease of the cross section avoids separation of the boundary layer and provides a uniform distribution of velocity at the oxidant nozzle outlet.

In a preferred embodiment, the burner assembly does not include a swirler. The burner assembly may be water-cooled or gas-cooled if appropriate. In such a case, the burner assembly includes an inlet and outlet for a cooling medium and a suitable internal chamber to be traversed by the cooling medium. A cooling system however is not essential and in some embodiments the burner assembly is not cooled.

In some embodiments, the oxidant outlet section is ahead of the fuel outlet section, and therefore the oxidant pipe extends into the combustion chamber, e.g. below the fuel outlet in a vertical arrangement. In alternative embodiments, the oxidant outlet section is retracted behind the fuel outlet section and therefore the oxidant nozzle ends within the fuel channel.

Embodiments with the oxidant nozzle ending within the fuel channel may be preferred because they provide additional room for combustion. Particularly, the lower part of the fuel channel (e.g. lower part of a neck of the reactor) may act as an additional combustion chamber, thus allowing a corresponding reduction in size of the main combustion chamber and of the whole reactor.

The applicant has found that a process of partial oxidation with the above described configuration of the oxidant nozzle provides a surprisingly low formation of soot, compared to a conventional nozzle with a circular cross section, for a given process condition.

It is believed that the reduced formation of soot is due to an increased contact surface between the fuel and the oxidant at the oxidant nozzle output, and consequently a better mixing, thanks to the shape of the elongate lobes. For given velocities and stream properties of the oxidant and fuel streams the lobed design of the oxidizer nozzle gives better mixing compared to a conventional circular nozzle.

Other advantages are: the coaxial arrangement of fuel and oxidant is preserved; no need of swirlers which would introduce significant pressure drops; the so obtained diffusion flame is relatively short resulting in a more uniform distribution of temperature in the combustion zone.

The invention is also applicable to secondary reforming. In a secondary reforming process the formation of soot is generally not an issue; however the invention is still beneficial in view of the better mixing of fuel and oxidant at a lower pressure drop, compared to the prior art.

The advantages will emerge even more clearly with the aid of the detailed description below, relating to a preferred embodiment.

BRIEF DESCRIPTION OF THE DRAWINGS

FIG. 1 shows a scheme of an ATR reactor for performing a process of partial oxidation according to an embodiment of the invention.

FIG. 2 illustrates details of the burner assembly of the reactor of FIG. 1 in a first embodiment.

FIG. 3 illustrates details of the burner assembly in a second embodiment.

DETAILED DESCRIPTION

Figure 4:
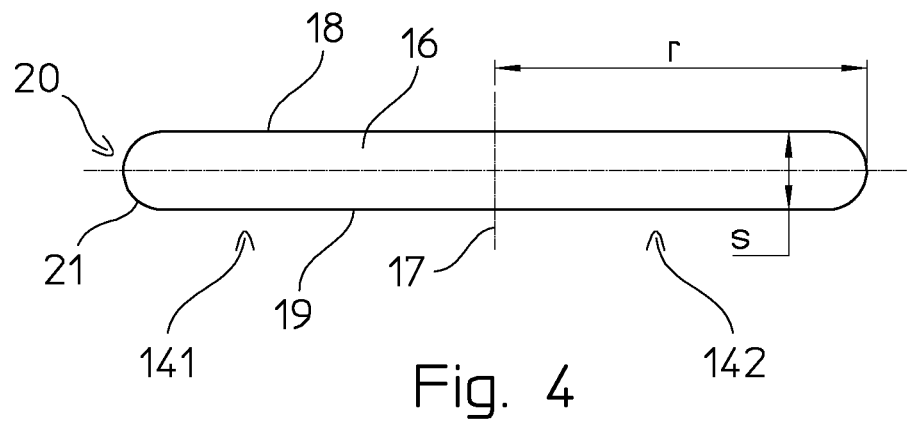
FIG. 4 illustrates the cross section of the nozzle output of the burner of FIG. 2 or FIG. 3, in one of the embodiments of the invention.

The figures illustrate an ATR reactor 1 with axis A-A which includes a vessel 30, a reaction chamber 2 inside the vessel 30 and a catalytic bed 3 in the reaction chamber 2.

The reactor 1 receives a gaseous fuel 5 via a fuel inlet 31 and an oxidant 4 and produces a product gas 6 which is a partially oxidized gas containing $H_2$ and CO.

The reactor 1 includes a burner assembly 10 fitted to the vessel 30 and installed above the reaction chamber 2.

The burner assembly 10 includes a single oxidant nozzle 11 located coaxially within a fuel channel 12 of the reactor 1. Particularly, the fuel channel 12 forms an annular pipe around the oxidant nozzle 11, the oxidant nozzle 11 and the fuel channel 12 having a common axis. In the example, the burner assembly is axially mounted and said common axis of the oxidant nozzle 11 and fuel channel 12 is the axis A-A of the reactor 1.

The fuel channel 12 is delimited by an upper neck 24 of the reactor 1. For example the fuel channel 12 is delimited by a refractory wall of the upper neck 24, which forms the outer wall of the fuel channel 12. The oxidant nozzle 11 forms an inner wall of an annular fuel passage within the fuel channel 12.

The oxidant nozzle 11 comprises an oxidant nozzle pipe 13 and an oxidant nozzle outlet 14.

The oxidant nozzle 11 is in communication with an oxidant inlet and the fuel channel 12 is in communication with the fuel inlet 31. Therefore, in operation, the oxidant nozzle 11 is fed with the oxidant 4 and the fuel channel 12 is fed with the fuel 5.

The oxidant 4 and the fuel 5 form two separate parallel coaxial streams. The oxidant 4 in the oxidant nozzle pipe 13 and the fuel 5 in the fuel channel 12 are initially separated by the surface wall of the oxidant nozzle pipe 13, and meet only at the oxidant nozzle outlet 14 (particularly at the oxidant outlet section 16) where they produce a diffusion flame F.

A fuel outlet section 15 is at the end of the fuel channel 12, and an oxidant outlet section 16 is at the end of the oxidant nozzle outlet 14.

FIG. 2 illustrates a first embodiment wherein the oxidant outlet section 16 is ahead of the fuel outlet section 15, towards the reaction chamber 2 and therefore the oxidant nozzle 11 extends into the mixing region 22 above the catalytic bed 3. In a vertical arrangement as shown, the oxidant outlet section 16 according to this first embodiment is below the fuel outlet section 15.

FIG. 3 illustrates a second embodiment wherein the oxidant outlet section 16 is above the fuel outlet section 15. Accordingly, the oxidant nozzle 11 ends in the fuel channel 12. In a vertical arrangement as shown, the oxidant outlet section 16 according to this second embodiment is above the fuel outlet section 15.

The oxidant 4 and the fuel 5 meet in a mixing region 22 which is in the upper part of the combustion chamber 2 and preferably extends into the neck 24. In an ATR reactor, including the catalytic bed 3, the mixing region 22 is above the catalytic bed 3.

In FIG. 3, it can be appreciated that the mixing and combustion begin in the lower region 24a of the neck 24. Said region 24a can be regarded as an additional mixing and combustion chamber, in addition to the main chamber 3 which is above the catalytic bed 3 and corresponds to the larger portion of the vessel 30.

An aspect of the invention is a multi-lobe configuration of the oxidant nozzle outlet 14. The oxidant nozzle outlet 14 may include two or more lobes as illustrated, for example, in FIGS. 4 and 5.

FIG. 4 relates to an embodiment where the oxidant nozzle outlet 14 terminates with a first lobe 141 and a second lobe 142 opposite to the first lobe, i.e. the lobes 141, 142 being spaced by 180° around the center axis 17 of the nozzle pipe 13.

Each elongate lobe 141 or 142 has two substantially parallel walls 18, 19 which merge at a distal tip 20. Each elongate lobe has a radial length r, from the center of the nozzle pipe 13 to the distal tip 20, which is greater than the distances between said two parallel walls 18, 19. Said ratio r/s is preferably 2 to 40, more preferably 5 to 20.

Accordingly, the termination of the oxidant nozzle outlet 14 takes the form of a flat body ("duckbill" end) and the outlet section 16 takes the form of an elongated rectangle with rounded edges 21. This leads to ample contact surface between the fuel and oxidant in a mixing region 22 downstream of the nozzle outlet 14 with the formation of a diffusion flame F.

Particularly, the oxidant 4 exits the oxidant nozzle 11 as a large and flat stream, coaxial to the fuel stream, with a larger contact surface around the oxidant stream of what would be achievable with a circular geometry. As shown in FIG. 2, the oxidant 4 and fuel 5 mix with coaxial flows in the region 22. The coaxial arrangement of flows in the mixing region is advantageous to reduce the pressure drop.

The applicant has found that the substantially flat shape of the so obtained diffusion flame F, although not radially symmetric, leads to unexpected low formation of soot. More specifically the soot level is much lower than a circular geometry with the same oxidant jet speed at the same process conditions.

According to another preferred feature, the oxidant nozzle 11 has a transition region 23 wherein the shape of the fuel nozzle gradually changes from the shape of the nozzle pipe 13 to the shape of nozzle outlet 14. The nozzle pipe 13 may also include a portion with a cross section gradually decreasing towards the nozzle outlet 14, to accelerate the oxidant stream 4 before it meets the fuel flow 5.

Figure 5:
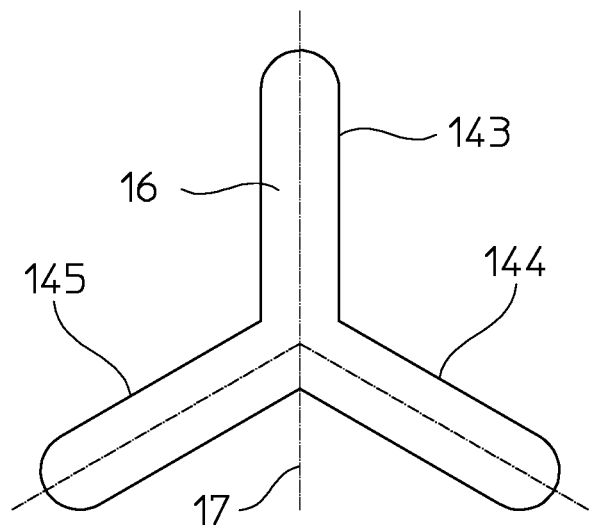
FIG. 5 illustrates another embodiment of nozzle output.

FIG. 5 illustrates an embodiment where the oxidant nozzle outlet 14 includes three elongate lobes 143, 144, 145 spaced by 120° in a star-like configuration. Other embodiments may include a greater number of lobes, although it is preferred to have two to eight lobes and even more preferably two to five lobes.

In a multilobe configuration, each lobe of the oxidant nozzle outlet 14 has preferably the above described shape as in FIG. 2 and the above mentioned preferred r/s ratio.

The process of the invention may be performed in a PDX reactor. This reactor may be similar to the reactor 1 illustrated above, but having no catalytic bed inside.

An ATR or PDX reactor may also comprise more than one burner assembly. Each burner assembly includes a single oxidant nozzle and constitutes a self-standing piece which is removable from the vessel e.g. for maintenance, inspection or replacement. Different burner assemblies may have the same or separate fuel input(s) and fuel channel(s).

The burner assembly can be water cooled or gas cooled in some embodiments. Gas cooling may be performed using steam or other gases. The coolant gas, after being used to cool the burner, can either be discharged into the unit or it can leave the unit via a dedicated outlet nozzle without being mixed with the gas flowing around the burner.

Figure 6:
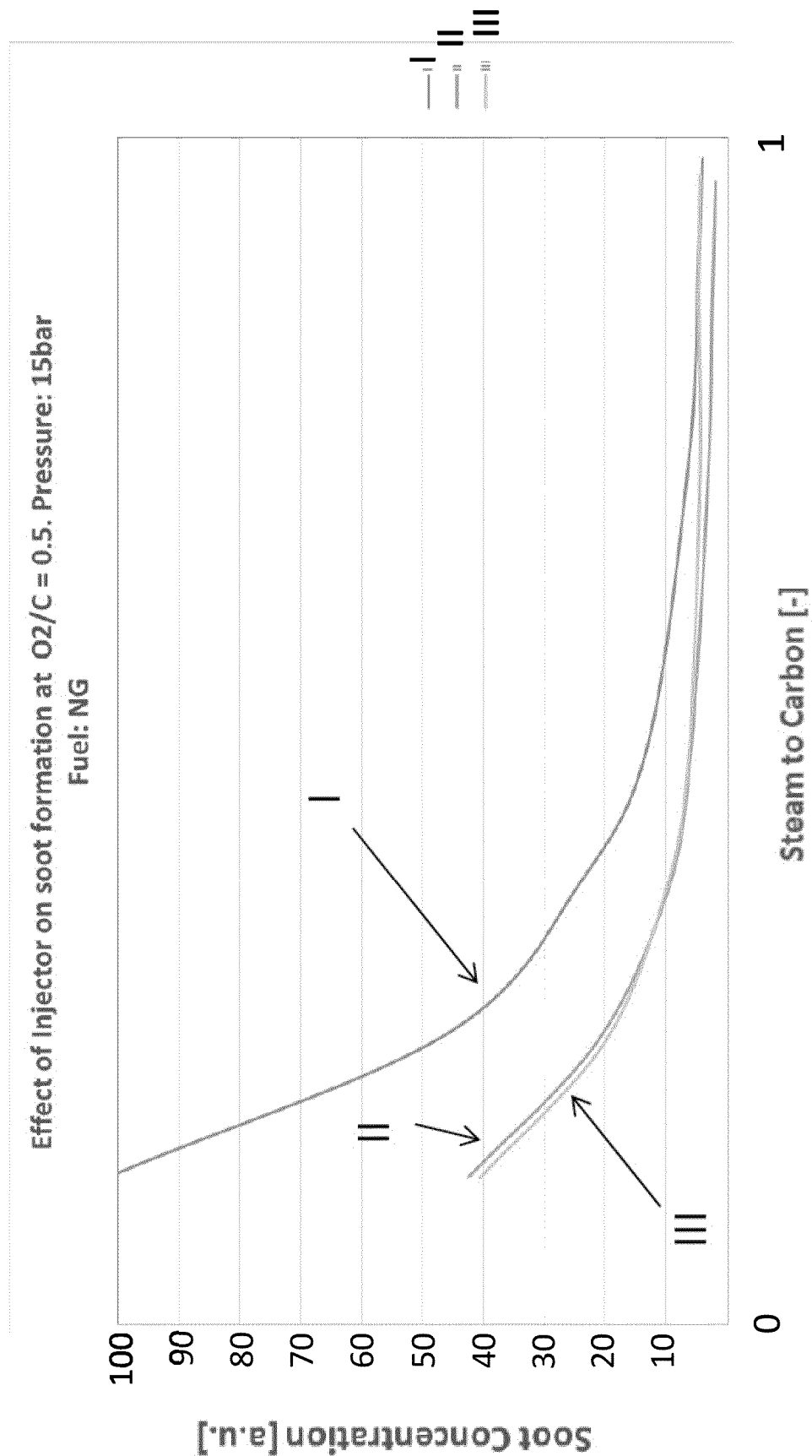
FIG. 6 plots experimental results of soot formation Vs. steam to carbon ratio for a nozzle of the prior art and for some embodiments of the invention.

FIG. 6 plots the soot concentration Vs. the steam to carbon ratio in a burner assembly of an ATR or PDX reactor according to the invention, at $O_2/C=0.5$ and pressure of 15 bar, using natural gas as fuel and oxygen as oxidant.

The plot I relates to a circular oxidant nozzle of the prior art; the plot II relates to a two-lobe oxidant nozzle and the plot III relates to a three-lobe oxidant nozzle.

FIG. 6 shows the considerable advantage of the invention in terms of low soot formation compared to a conventional burner with a circular oxidant nozzle, particularly at low steam to carbon ratio.

What is claimed is:

1. A process for the production of synthesis gas containing hydrogen and carbon monoxide through a step of partial oxidation of a gaseous hydrocarbon fuel, wherein:
   said step of partial oxidation is performed in a reactor including a vessel, a reaction chamber and at least one burner assembly;
   said burner assembly has a single oxidant nozzle;
   said reactor includes at least one fuel channel which is in communication with an inlet of said gaseous hydrocarbon fuel;
   said oxidant nozzle comprises an oxidant nozzle pipe and an oxidant nozzle outlet,
   said oxidant nozzle pipe is coaxially arranged inside the fuel channel;
   the oxidant nozzle pipe and the fuel channel are arranged to produce a diffusion flame;
   the oxidant nozzle outlet has a shape with two or more elongate lobes projecting from an axis of the oxidant nozzle pipe;
   the process includes: feeding an oxidant in the oxidant nozzle of the reactor;
   feeding an hydrocarbon fuel in the fuel channel of the reactor, forming a diffusion flame at the outlet of the fuel nozzle.

2. The process according to claim 1, wherein said oxidant nozzle outlet of the reactor has two elongate lobes symmetrically arranged opposite to each other.

3. The process according to claim 1, wherein said oxidant nozzle outlet of the reactor has three or more elongate lobes which are radially arranged around the center of the oxidant nozzle pipe.

4. The process according to claim 3, wherein the radially arranged elongate lobes of the reactor have a regular angular spacing.

5. The process according to claim 3, wherein the number of radially arranged lobes of the reactor is two to eight.

6. The process according to claim 1, wherein each elongate lobe of the reactor has two substantially parallel walls which merge at a distal tip of the lobe, and each elongate lobe has a radial length, from the center of the oxidant nozzle pipe to the distal tip, which is greater than the distance between said two parallel walls.

7. The process according to claim 6, wherein the ratio (r/s) of said radial length over said distance between parallel walls is at least 2.

8. The process according to claim 1, wherein the oxidant nozzle of the reactor has a transition region wherein the shape of the oxidant nozzle gradually changes from the shape of the nozzle pipe to the shape of nozzle outlet.

9. The process according to claim 1, wherein the oxidant nozzle pipe of the reactor includes a portion with a cross section gradually decreasing towards the nozzle outlet.

10. The process according to claim 1, wherein the oxidant nozzle and the fuel channel of the reactor are coaxial.

11. The process according to claim 1, the burner assembly of the reactor being water-cooled or gas-cooled.

12. The process according to claim 1, the burner of the reactor being made of any of: metal, a ceramic material, a composite ceramic material or a combination of these materials.

13. The process according to claim 1, wherein said at least one burner assembly of the reactor is coupled to the vessel so that the oxidant nozzle of the burner assembly is at least partially accommodated within a fuel channel of the reactor.

14. The process according to claim 1, wherein the reactor includes a plurality of burner assemblies fitted to the vessel and a plurality of fuel channels, wherein each of said burner assemblies has a respective oxidant nozzle and each oxidant nozzle is installed within a respective fuel channel and each of said fuel channels accommodate a single oxidant nozzle.

15. The process according to claim 1, the reactor including at least one fuel channel which does not accommodate any oxygen nozzle.

16. The process according to claim 15, the reactor including a single fuel channel and a plurality of burner assemblies arranged around said fuel channel.

17. The process according to claim 5, wherein the number of radially arranged lobes of the reactor is three or four.

18. The process according to claim 7, wherein the ratio (r/s) of said radial length over said distance between parallel walls is 2 to 40.

19. The process according to claim 7, wherein the ratio (r/s) of said radial length over said distance between parallel walls is 5 to 20.

20. The process according to claim 1, wherein the oxidant nozzle ends within the fuel channel, so that a lower part of said fuel channel makes an additional reaction chamber.

* * * * *